Patented Nov. 21, 1950

2,531,276

UNITED STATES PATENT OFFICE 2,531,276

METHOD FOR KILLING WEEDS

Walter C. Klingel, Basking Ridge, N. J.

No Drawing. Application March 6, 1946,
Serial No. 652,490

4 Claims. (Cl. 71—2.7)

The present invention relates to herbicides and more particularly to a method and composition for the killing of weeds, such as crab grass, plantain, dandelion, poison ivy, wild garlic and others.

The weed killers which have been generally used for many years are chemicals such as ammonium salts, iron salts, salts containing arsenic and various other inorganic salts, and also more recently various organic compounds which have not proved to be entirely satisfactory. Many of the weed killers which have been used kill not only the weeds which they are intended to kill, but also grass, plants and other vegetation, and usually have a deleterious action on the soil, making it unfit for plant growth and for the growth of grass for considerable periods of time.

Certain weed killers heretofore used affect the chlorophyll, the green coloring matter of plants, so that the leaves of plants and the blades of grass turn brown, by which the plants and grass are thereafter unable to take up carbon dioxide from the air in the presence of sunlight to perform the function of synthesizing cellulose and other products required for plant growth. Recent studies have been made to develop a number of compositions which may be used to provide a selective action on weeds without killing the desired plant life, such as grass, which is to be protected. It is well understood that in general weeds are more hardy than grass, and other desired vegetation, and frequently grow at such a rapid rate in comparison with the growth of grass and other cultivated vegetation as to crowd out or choke out the desired vegetable growth.

As a result of experimentation and tests over a long period of time, it has been found that certain alkali-metal higher alkyl sulphates, which may be sprayed in certain concentrations in water over the vegetation in which the weeds are to be exterminated, are extremely effective in the killing of ordinary weeds, such as crab grass, without permanently affecting the grass or other vegetation to be preserved.

Among the alkali-metal higher alkyl sulphates which have been found most effective are sodium 2-ethylhexyl sulphate, sodium tetradecyl sulphate and sodium heptadecyl sulphate, which when used in concentrations of one part of the chemical with 10 to 25 parts of water may be sprayed on the vegetation by which the weeds are killed without permanently injuring grass and other vegetation.

In the use of sodium tetradecyl sulphate, one part of the chemical may be mixed with 5 parts of water and sprayed on a combination of lawn grass and weeds consisting mainly of crab grass. It was found as the result of repeated experiments with this concentration, that after a period of about twelve hours after the spraying, the weeds were completely dead and the blades of grass had turned brown to a considerable extent. Within a period of from two to three weeks, however, the grass which had been sprayed had returned to its natural green color, and was healthier and more profuse in growing than prior to the spraying operation.

In the use of sodium tetradecyl sulphate in a concentration of one part of the chemical with 15 parts of water, and sprayed on vegetation in the same manner as the solution above referred to, the weeds were completely dead after a period of twenty-four hours, and the blades of grass retained their natural green color and were not affected by the solution.

In the use of the same chemical, sodium tetradecyl sulphate, using one part of the chemical to 25 parts of water, the weeds were substantially all killed in a period of from 24 to 36 hours, and the grass retained its natural green color without being affected by the solution.

In these experiments, the lawn grass was at least a year old, and it was found that new grass would be killed by the solution and older grass up to three or four months old would be affected to a greater or less extent, depending upon conditions. Grass which is continuously exposed during the day to hot sunlight is more affected than grass which is in the shade or partly in shade during the day. In each case in which this chemical was tried, it was found that the soil was not made infertile, and grass seed which was sowed on soil which had been sprayed with the said chemical twenty-four hours previously did not prevent germination of the seed and the use of the spray appeared to have no effect whatever on the subsequent growth of the grass.

In experiments using sodium 2-ethylhexyl sulphate, it was found that a solution using one part of the chemical to 5 parts of water killed crab grass and other weeds within twelve hours, but blades of grass turned brown and remained off color for a period of two to three weeks before returning to its natural color.

In the use of one part of the chemical with 15 parts of water, and spraying onto a lawn having in the neighborhood of 25% of crab grass, it was found that after a period of twenty-four hours all of the crab grass was dead and the remaining grass retained its natural green color and was not affected by the solution. Substantially the same effect was observed in the use of a solution of the same chemical in which one part of the sodium 2-ethylhexyl sulphate was used with 25 parts of water, but the action of the spray took effect after the lapse of a substantially longer time than in the use of the more concentrated solution. In the use of this chemical the soil did not become infertile and grass seed was able to grow when sowed the next day after a lapse of about twenty-four hours after the use of the spray.

The chemical sodium heptadecyl sulphate was found to be effective in substantially the same concentrations as those above referred to in connection with sodium tetradecyl sulphate and sodium 2-ethylhexyl sulphate and was found to have a selective effect in the killing of weeds in general over the effect upon grass and other desired vegetation. It was found to have no permanent effect when sprayed on the ground after a period of twenty-four hours and did not prevent the germination of grass seed and other seed when planted in the soil twenty-four hours after using the chemical spray.

The chemicals above referred to are much more effective than a large variety of other organic chemicals which I have tried out in the same manner. They have approximately the same degree of weed killing effect, although for general purposes the sodium tetradecyl sulphate was found to be the most efficient among the alkali-metal higher sulphates of the invention.

While the use of the specific chemicals above referred to are preferred, it is to be understood that other chemicals such as the potassium and ammonium compounds of tetradecyl sulphate, and of the 2-ethylhexyl and of the heptadecyl sulphate, may be used with substantially the same effect, although the sodium compounds are generally preferred on account of the lower cost. It will be apparent, however, that in the use of the ammonium compounds the ammonia has value in the soil as a fertilizer and under some conditions its use may be preferred. Compounds which differ from those above referred to only by a small alkyl group, such as the methyl group, for example, produces substantially the same effect as those above referred to, and I do not wish to be limited, therefore, to the use of the specific chemicals above referred to.

It will be understood that various changes or modifications may be made in the method and composition for the killing of weeds as above disclosed without departing from the spirit or scope of the invention as defined in the claims. It is obvious that the weed killing compositions above referred to, as claimed herein, may be used alone or in combination with each other, or with diluents, or in combination with other compounds, such as insecticides, for example, without departing from the invention hereinafter defined.

Having thus described the invention, what is claimed as new is:

1. A method for selectively killing weeds without rendering soil infertile or preventing germination of grass seed therein which comprises applying to growing weeds to be destroyed a water solution containing one part of a compound selected from the group consisting of the alkali metal higher alkyl sulphates and ammonium higher alkyl sulphates together with from five to twenty-five parts of water.

2. A method for selectively killing weeds without rendering soil infertile or preventing germination of grass seed therein which comprises applying to growing weeds to be destroyed a water solution containing one part of at least one of the members of the group consisting of an alkali metal salt of 2-ethylhexyl sulphate, tetradecyl sulphate and heptadecyl sulphate, and the ammonium salts of said alkyl sulphates, together with from five to twenty-five parts of water.

3. A method for selectively killing weeds without rendering soil infertile or preventing germination of grass seed therein which comprises applying to growing weeds to be destroyed a water solution containing one part of at least one of the members of the group consisting of sodium 2-ethylhexyl sulphate, sodium tetradecyl sulphate and sodium heptadecyl sulphate, together with from five to twenty-five parts of water.

4. A method for selectively killing weeds without rendering soil infertile or preventing germination of grass seed therein which comprises applying to growing weeds to be destroyed a water solution containing one part of at least one of the members of the group consisting of ammonium 2-ethylhexyl sulphate, ammonium tetradecyl sulphate and ammonium heptadecyl sulphate, together with from five to twenty-five parts of water.

WALTER C. KLINGEL.

REFERENCES CITED

The following references are of record in the file of this patent:

UNITED STATES PATENTS

| Number | Name | Date |
| --- | --- | --- |
| 1,625,608 | Holmes | Apr. 19, 1927 |
| 2,056,121 | Carter | Sept. 29, 1936 |
| 2,084,506 | Rosen | June 22, 1937 |
| 2,088,019 | Wickert | July 27, 1937 |
| 2,277,744 | Cupery et al. | Mar. 31, 1942 |
| 2,390,941 | Jones | Dec. 11, 1945 |
| 2,392,859 | Meuli | Jan. 15, 1946 |

OTHER REFERENCES

Cupples, "Commercially Available Detergents . . .," Div. of Insecticide Investigators, No. E-504, June 1940, pp. 1, 49.

Beeler, Bulletin of Natl. Formulary Committee, vol. 10, No. 8-9, Aug.-Sept. 1942, pg. 212.

Industrial & Engineering Chemistry, July 1944, pp. 610 to 617.